United States Patent
Kawada

(10) Patent No.: US 9,156,492 B2
(45) Date of Patent: Oct. 13, 2015

(54) ENERGY ABSORBING STEERING APPARATUS

(71) Applicant: JTEKT CORPORATION, Osaka-shi, Osaka (JP)

(72) Inventor: Yoshikazu Kawada, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/402,580

(22) PCT Filed: May 24, 2013

(86) PCT No.: PCT/JP2013/064437
§ 371 (c)(1),
(2) Date: Nov. 20, 2014

(87) PCT Pub. No.: WO2013/176240
PCT Pub. Date: Nov. 28, 2013

(65) Prior Publication Data
US 2015/0137499 A1 May 21, 2015

(30) Foreign Application Priority Data
May 25, 2012 (JP) .................. 2012-119593

(51) Int. Cl.
*B62D 1/00* (2006.01)
*B62D 1/19* (2006.01)

(52) U.S. Cl.
CPC ................ *B62D 1/195* (2013.01); *B62D 1/192* (2013.01)

(58) Field of Classification Search
CPC ................... B62D 1/195; B62D 1/192
USPC ......................................................... 280/777
See application file for complete search history.

(56) References Cited

U.S. PATENT DOCUMENTS

| 5,052,716 A | * | 10/1991 | Matsumoto | .................... 280/777 |
| 2011/0084470 A1 | * | 4/2011 | Tanioka et al. | ................ 280/777 |

(Continued)

FOREIGN PATENT DOCUMENTS

| JP | S5081532 | 7/1975 |
| JP | H0529185 Y | 7/1993 |

(Continued)

OTHER PUBLICATIONS

Aug. 13, 2013 International Search Report issued in Japanese Application No. PCT/JP2013/064437. Nov. 25, 2014 International Preliminary Report on Patentability issued in Japanese Patent Application No. PCT/JP2013/064437.

*Primary Examiner* — Faye M Fleming
(74) *Attorney, Agent, or Firm* — Oliff PLC

(57) ABSTRACT

An energy absorbing steering apparatus in which shock applied to a steering column is absorbed by plastic deformation of a bracket for suspending the steering column from a vehicle body. The bracket includes: a first plate portion; a second plate portion bent from a rear edge of the first plate portion toward a lower portion; a third plate portion bent from a lower edge of the second plate portion toward a rear upper portion; and a fourth plate portion bent from an upper edge of the third plate portion toward the lower portion. An angle of a first bent portion between the first and second plate portions is an obtuse angle. An angle of a second bent portion between the second and third plate portions is an acute angle. An angle of a third bent portion between the third and fourth plate portions is an acute angle.

3 Claims, 5 Drawing Sheets

(56) References Cited

U.S. PATENT DOCUMENTS

2011/0100148 A1* 5/2011 Jung .............................. 74/492
2012/0006142 A1* 1/2012 Jung .............................. 74/493

FOREIGN PATENT DOCUMENTS

JP          2008087537 A    4/2008
WO         2011158621 A1   12/2011

* cited by examiner

FIG.5

|  | ANGLE B1 ANGLE C1 (deg.) | LOWERING DISTANCE (mm) |
|---|---|---|
| COMPARATIVE EXAMPLE | 90.0 | 7.10 |
| EXAMPLE 1 | 81.1 | 6.33 |
| EXAMPLE 2 | 72.5 | 4.77 |
| EXAMPLE 3 | 62.6 | 0.79 |

ENERGY ABSORBING STEERING APPARATUS

TECHNICAL FIELD

The present invention relates to an energy absorbing steering apparatus in which shock applied to a steering column is absorbed by plastic deformation of a bracket for suspending the steering column from a vehicle body.

BACKGROUND ART

In the event of a collision of a vehicle, a secondary collision in which the driver bumps against the steering wheel occurs to cause a steering column to be moved axially forwardly with respect to the vehicle body. As means for causing axially forward movement, a dedicated energy absorbing apparatus may be disposed, or, as disclosed in Patent Literature 1, a configuration may be employed where a bracket itself suspending the steering column from the vehicle body is provided with an energy absorbing function.

The bracket is a lower bracket which is to be fixed to a front lower portion of the steering column. The lower bracket includes: a first plate portion which is to be fixed to the vehicle body; a second plate portion which is bent from the front edge of the first plate portion toward a lower portion of the vehicle body; a third plate portion which is bent from the lower edge of the second plate portion toward a rear upper portion of the vehicle body; and a fourth plate portion which is bent from the upper edge of the third plate portion toward the lower portion of the vehicle body. A lower portion of the steering column is fixed to the fourth plate portion.

The lower bracket is formed by bending a plate member by using a press die. In the lower bracket, a first bent portion is between the first plate portion and the second plate portion, a second bent portion is between the second plate portion and the third plate portion, and a third bent portion is between the third plate portion and the fourth plate portion. The first bent portion has an acute angle, and the second bent portion and the third bent portion have a right angle.

The steering column is placed in parallel to the traveling direction of the vehicle as viewed from the upper side, and, as viewed from the lateral side, inclinedly placed so that the steering wheel side is in the upper side. In order to allow the steering column to be moved in an axially forward direction by a secondary collision, the fourth plate portion must be moved in the axially forward direction of the steering column while maintaining its posture.

In order to realize such a movement, the angles of the first bent portion, the second bent portion, and the third bent portion must be increased from the respective angles which are formed by the press die.

PRIOR ART REFERENCE

Patent Literature

Patent Literature 1: JP-A-2008-87537

SUMMARY OF THE INVENTION

Problems that the Invention is to Solve

When the angles are increased, the position of the second bent portion is lowered with respect to the first bent portion, and that of the third bent portion is lowered with respect to the second bent portion. Moreover, the moment length from the fourth plate portion to the first bent portion is longest, and that from the fourth plate portion to the third bent portion is shortest. Therefore, the increase of the angle of the first bent portion is larger than that of the angle of the third bent portion. As a result, the fourth plate portion cannot maintain its posture, and hence there is a problem in that the portion is like to be largely moved to a positon lower than the axis of the steering column.

The invention has been conducted in order to solve the above-discussed problem. It is an object of the invention to provide an energy absorbing steering apparatus in which a movement of a plate portion to a position lower than the axis of a steering column is reduced while maintaining its posture.

Means for Solving the Problems

The invention provides an energy absorbing steering apparatus in which shock applied to a steering column is absorbed by plastic deformation of a bracket for suspending the steering column from a vehicle body, wherein the bracket includes: a first plate portion which is to be fixed to the vehicle body; a second plate portion which is bent from a rear edge of the first plate portion toward a lower portion of the vehicle body; a third plate portion which is bent from a lower edge of the second plate portion toward a rear upper portion of the vehicle body; a fourth plate portion which is bent from an upper edge of the third plate portion toward the lower portion of the vehicle body; a first bent portion which is between the first plate portion and the second plate portion; a second bent portion which is between the second plate portion and the third plate portion; and a third bent portion is between the third plate portion and the fourth plate portion, the fourth plate portion is perpendicular to an axial direction of the steering column, and the steering column is fixed to the fourth plate portion, an angle of the first bent portion is an obtuse angle, and each of an angle of the second bent portion and an angle of the third bent portion is an acute angle.

According to the configuration, a movement of the fourth plate portion to a position lower than the axis of the steering column while maintaining its posture can be reduced.

The second plate portion and the fourth plate portion may be parallel to each other.

According to the configuration, the movement of the fourth plate portion to a position lower than the axis of the steering column can be further reduced while maintaining its posture.

The angle of the second bent portion and the angle of the third bent portion are equal to each other and in a relation of alternate-interior angles.

According to the configuration, the movement of the fourth plate portion to a position lower than the axis of the steering column can be further reduced while maintaining its posture.

Advantage of the Invention

According to the invention, a movement of the fourth plate portion to a position lower than the axis of a steering column can be reduced while maintaining its posture.

BRIEF DESCRIPTION OF THE DRAWINGS

FIG. 5 is a table showing relationships of angles B1 and C1 of the lower bracket and a lowering distance in the embodiment of the invention.

EMBODIMENTS FOR CARRYING OUT THE INVENTION

Figure 1:
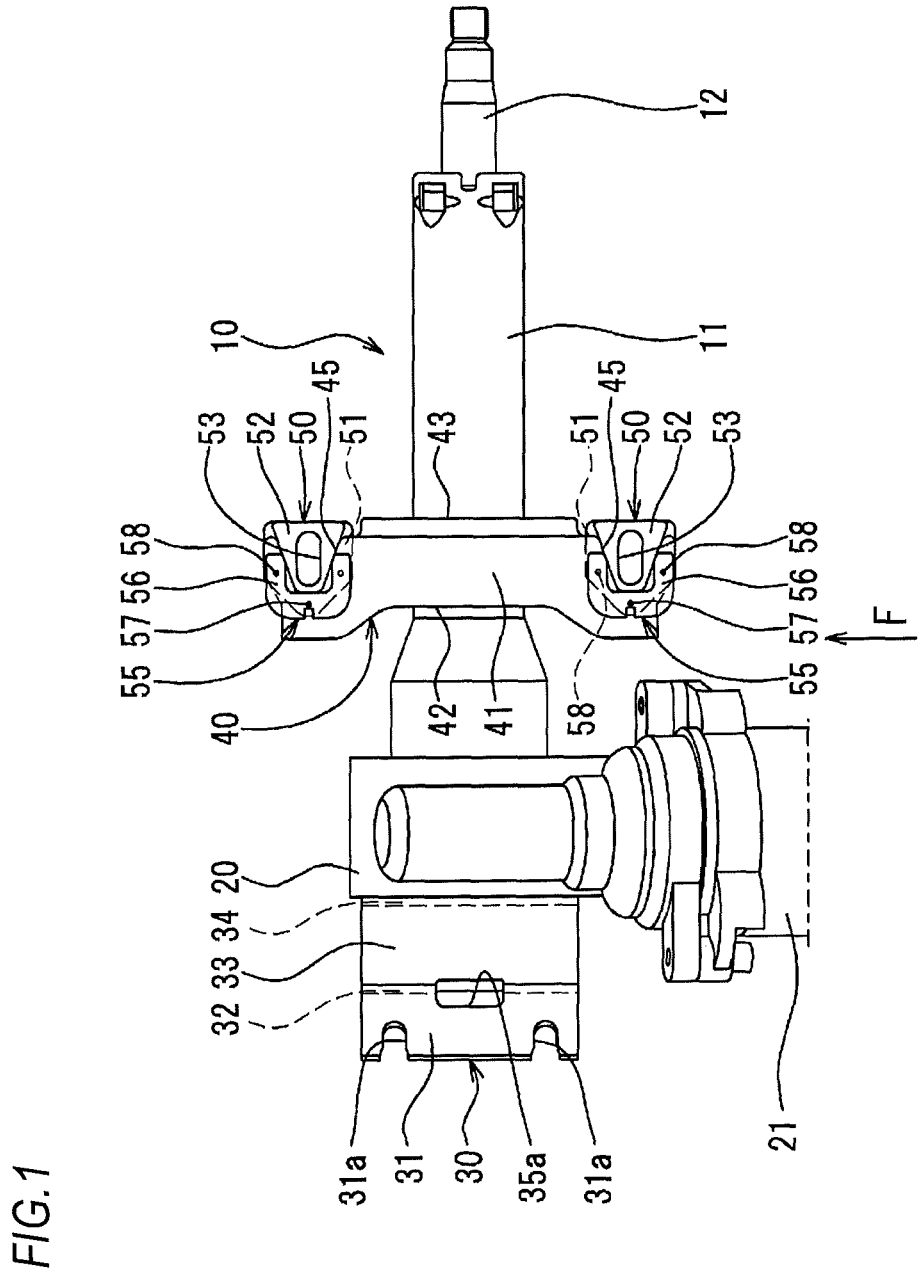
FIG. 1 is a plan view of a vehicle steering apparatus in an embodiment of the invention.
Figure 3:
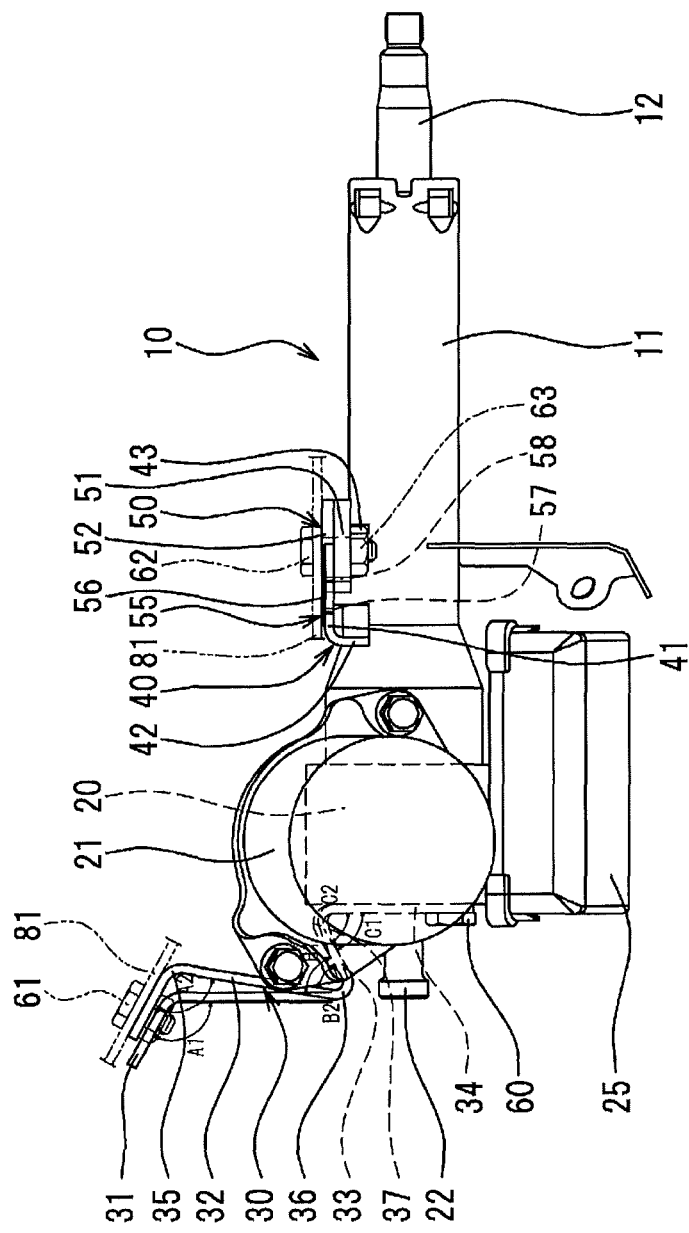
FIG. 3 is a view of the vehicle steering apparatus in the embodiment of the invention in a state of a secondary collision.
Figure 4:
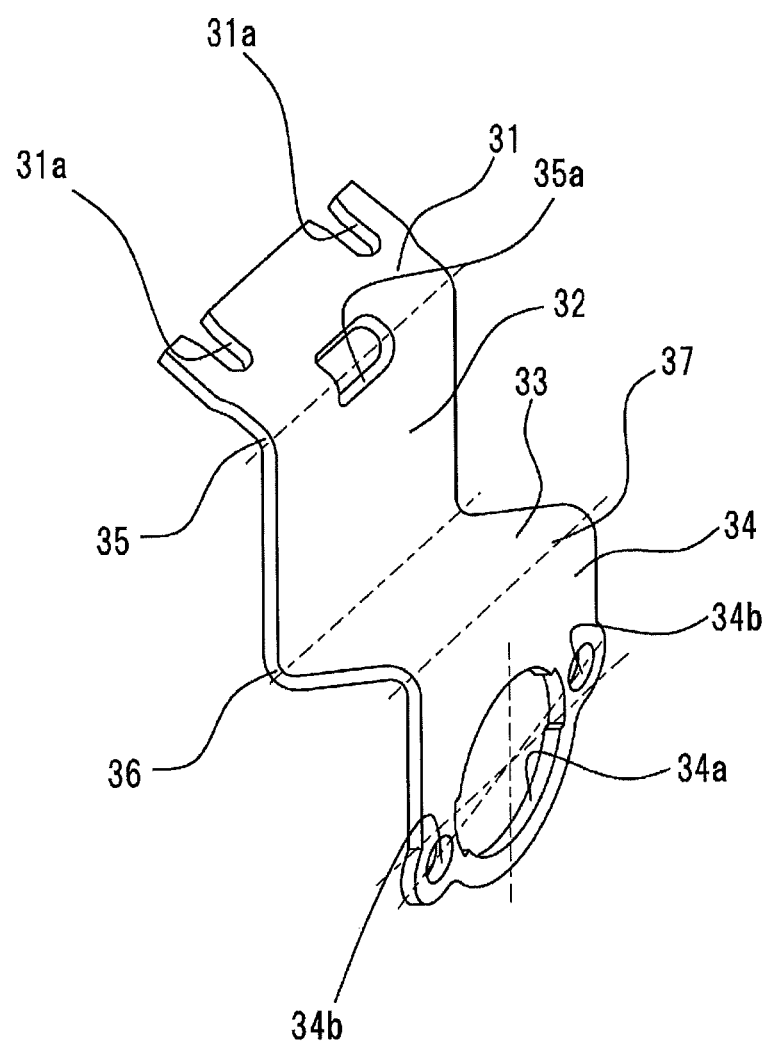
FIG. 4 is a perspective view of a lower bracket in the embodiment of the invention.

An embodiment of the invention will be described with reference to FIGS. 1 to 5. FIG. 1 is a plan view of a vehicle steering apparatus, FIG. 2 is a view as seen along arrow F in FIG. 1, FIG. 3 is a view of the vehicle steering apparatus in a state of a secondary collision, FIG. 4 is a perspective view of a lower bracket, and FIG. 5 is a table showing relationships of angles B1 and C1 and a lowering distance.

Figure 2:
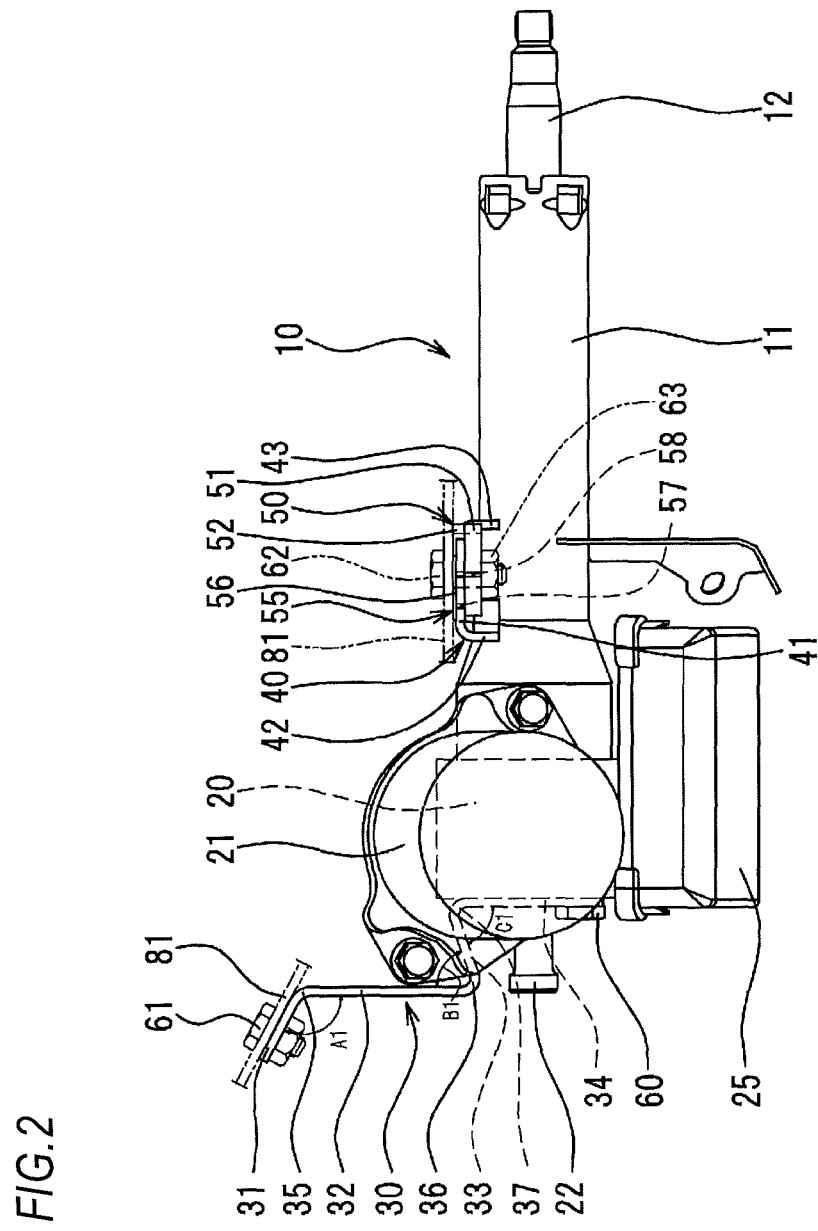
FIG. 2 is a view as seen along arrow F in FIG. 1 in the embodiment of the invention.

As shown in FIGS. 1 and 2, the vehicle steering apparatus 10 is attached to a vehicle body 81 which is in the living space for the driver, and has a steering tube 11, a gear housing 20, and the like. The vehicle steering apparatus 10 in this specification means a column portion which extends from a steering wheel that is not shown, to a portion immediately before an intermediate shaft. The vehicle steering apparatus 10 has a power assist function due to an electric motor 21 which will be described later. The intermediate shaft is further coupled to tires via a pinion shaft and rack shaft which are not shown. The vehicle steering apparatus 10 which is described here corresponds to the steering column, and an assembly in which an upper bracket 40 and a lower bracket 30 are added to the vehicle steering apparatus corresponds to the energy absorbing steering apparatus.

The vehicle steering apparatus 10 has the steering tube 11. A steering shaft 12 is rotatably pivotally supported on the steering tube 11 via a rolling bearing which is not shown. A steering wheel which is not shown is coupled to one end of the steering shaft 12, and the intermediate shaft which is not shown is coupled to the other end of the steering shaft 12. The gear housing 20 is integrally coupled to one end of the steering tube 11 which is opposite to the steering wheel. The steering tube 11 is made of steel and has a pipe-like shape. The gear housing 20 is a cast product made of aluminum.

The gear housing 20 incorporates a rotation shaft 22, a reduction mechanism, and a torque sensor. One end of the rotation shaft 22 is coupled to the steering shaft 12, and the other end of the rotation shaft 22 is coupled to the intermediate shaft which is not shown. As the reduction mechanism, a worm wheel and a worm gear are used. The rotation of the electric motor 21 attached to the gear housing 20 is transmitted to the rotation shaft via the worm gear and the worm wheel so that the steering operation of the steering wheel is power assisted by the electric motor 21. A control box 25 which controls the voltage to be applied to the electric motor 21 is attached to the gear housing 20.

The lower bracket 30 is attached to the side surface of the gear housing 20 which is on the side of the intermediate shaft, via coupling bolts 60. The lower bracket 30 is fixed to the vehicle body 81 of the vehicle via fixing bolts 61. The lower bracket 30 has a function of absorbing shock in a secondary collision, by plastic deformation of itself.

As shown in FIG. 4, the lower bracket 30 includes: a first plate portion 31 which is to be fixed to the vehicle body 81 of the vehicle; a second plate portion 32 which is bent from the rear edge of the first plate portion 31 toward a lower portion of the vehicle body; a third plate portion 33 which is bent from the lower edge of the second plate portion 32 toward a rear upper portion of the vehicle body; a fourth plate portion 34 which is bent from the upper edge of the third plate portion 33 toward the lower portion of the vehicle body; a first bent portion 35 which is between the first plate portion 31 and the second plate portion 32; a second bent portion 36 which is between the second plate portion 32 and the third plate portion 33; and a third bent portion 37 is between the third plate portion 33 and the fourth plate portion 34.

Attachment grooves 31a through which shaft portions of the fixing bolts 61 are to be passed are formed in the first plate portion 31. An adjustment hole 35a for adjusting the bending strength of the first bent portion 35 is penetratingly formed in the first plate portion 31, the first bent portion 35, and the second plate portion 32. The bending strength of the first bent portion tends to be lowered in accordance with the increase of the size of the adjustment hole 35a. A penetrating hole 34a through which the rotation shaft 22 is to be passed, and coupling holes 34b through which the coupling bolts 60 are to be passed are penetratingly formed in the fourth plate portion 34.

The lower bracket 30 is formed by punching a steel plate by a press die, and bending the punched product. The plate is bent at the first bent portion 35, the second bent portion 36, and the third bent portion 37, and the one plate is divided into the first plate portion 31, the second plate portion 32, the third plate portion 33, and the fourth plate portion 34 across the bent portions 35, 36, 37. The second plate portion 32 and the fourth plate portion 34 are parallel to each other, and the second bent portion 36 and the third bent portion 37 are in the relation of alternate-interior angles. The alternate-interior angles are acute angles. In a state where the lower bracket is bendingly formed by the press die, as shown in FIG. 2, the angle of the first bent portion 35 is A1, that of the second bent portion 36 is B1, and that of the third bent portion 37 is C1. The angle B1 and the angle C1 are alternate-interior angles and acute angles. Namely, the angle B1 and the angle C1 are equal to each other.

As shown in FIGS. 1 and 2, the upper bracket 40 is coupled to the steering tube 11 by welding or the like. The upper bracket 40 is fixed to the vehicle body 81 via first capsules 50 and attaching bolts 62.

The upper bracket 40 includes: a horizontal plate portion 41 which extends in a horizontal direction; a first vertical plate portion 42 which is bent from the front edge of the horizontal plate portion 41 toward a lower portion of the vehicle body; and a second vertical plate portion 43 which is bent from the rear edge of the horizontal plate portion 41 toward a lower portion of the vehicle body. The steering tube 11 is fixed to lower portions pf the first vertical plate portion 42 and the second vertical plate portion 43 by welding or the like.

In the horizontal plate portion 41, attachment grooves 45 are formed in the both sides in the lateral direction of the vehicle body across the steering tube 11, respectively. The attachment grooves 45 are passed in the vertical direction of the vehicle body, and opened toward the rear side of the vehicle body. In the horizontal plate portion 41, moreover, through holes which vertically penetrate through the plate portion are formed in the both sides of the attachment grooves 45 in the lateral direction of the vehicle body, and in the front direction of the vehicle body.

The first capsules 50 are fitted into the attachment grooves 45 of the horizontal plate portion 41, respectively. Each of the first capsules 50 includes: a flange portion 51 which butts against the lower surface of the horizontal plate portion 41; and a fitting portion 52 which is fitted into the attachment groove 45. The flange portion 51 is horizontally projected with respect to the fitting portion 52. A long hole 53 which vertically penetrates is formed in the fitting portion 52. In the flange portion 51, fitting holes are formed at positions corresponding to the through holes of the horizontal plate portion 41.

Second capsules 55 are placed in the peripheries of the attachment groove 45, respectively. Each of the second capsules 55 includes: a flat plate portion 56 which butts against the upper surface of the horizontal plate portion 41; and a first pin 57 and second pins 58 which are projected more downward than the flat plate portion 56. The first pin 57 is pressingly fitted into the through hole of the horizontal plate portion 41, and the second pins 58 are pressingly fitted into the through holes of the horizontal plate portion 41, and the fitting holes of the flange portion 51. In this way, the second capsule 55 is integrated with the first capsule 50 across the horizontal plate portion 41. In this state, via through holes of the vehicle body 81 which are not shown, shaft portions of the attaching bolts 62 are passed through the long holes 53 of the first capsule 50, and nuts 63 are screwed to the attaching bolts 62, whereby the upper bracket 40 is fixed to the vehicle body 81.

When a forward force due to a secondary collision acts on the upper bracket 40, the first pins 57 and second pins 58 of the second capsules 55 are broken as shown in FIG. 3, and the upper bracket 40 is separated from the first capsules 50 and the second capsules 55. Namely, the first capsules 50 and the second capsules 55 have a function of fixing the upper bracket 40 to the vehicle body 81, and a further function of absorbing a shock force of a secondary collision.

As described above, the force of absorbing shock in a secondary collision is given by plastic deformation of the lower bracket 30, and breakages of the first pins 57 and second pins 58 of the second capsules 55.

Next, based on the above-described configuration, an assembling operation will be described.

As shown in FIGS. 1 and 2, to the steering tube 11, the upper bracket 40 is fixed by welding, and the gear housing 20 is fittingly fixed. The steering shaft 12 is rotatably pivotally supported on the steering tube 11, and the electric motor 21 and the like are incorporated in the gear housing 20. In this state, the first pins 57 and second pins 58 of the second capsules 55 are pressingly inserted into the through holes of the horizontal plate portion 41, and the fitting holes of the first capsules 50 are pressingly inserted onto the second pins 58. In this way, the second capsules 55 are integrated with the first capsules 50 across the horizontal plate portion 41. The lower bracket 30 is attached to the gear housing 20 via the coupling bolts 60, and fixed to the vehicle body 81 via the fixing bolts 61. The shaft portions of the fixing bolts 61 are passed through the vehicle body 81, further passed through the long holes 53 of the first capsules 50, and the nuts 63 are screwed to the attaching bolts 62. As a result, the vehicle steering apparatus 10 is fixed to the vehicle body 81.

When the vehicle collides with another vehicle, the driver is caused to secondarily collide with the steering wheel by an inertial force. The force of the secondary collision acts on the lower bracket 30 and the upper bracket 40 via the steering shaft 12, the steering tube 11, and the gear housing 20. The force of the secondary collision acting on the upper bracket 40 is absorbed by the breakage of the first pins 57 and the second pins 58. The force of the secondary collision acting on the lower bracket 30 is absorbed by the plastic deformation of the lower bracket 30.

The plastic deformation of the lower bracket 30 is performed by a phenomenon in which, as shown in FIG. 3, the angle A1 of the first bent portion 35 is changed to an angle A2, the angle B1 of the second bent portion 36 is changed to an angle B2, and the angle C1 of the third bent portion 37 is changed to an angle C2. The angle A2 A1 is reduced with respect to the angle A1, the angle B2 is reduced with respect to the angle B1, and the angle C2 is reduced with respect to the angle C1. The reduction amount of the angle which is obtained by A1-A2 A1 is larger than that of the angle which is obtained by B1-B2. The reduction amount of the angle which is obtained by B1-B2 is larger than that of the angle which is obtained by C1-C2. Namely, the angle change in the first bent portion 35 is larges, and the angle changes are reduced in the sequence of the second bent portion 36 and the third bent portion 37.

The angle A1 is an obtuse angle. When the angle A1 is reduced to the angle A2, the second bent portion 36 is moved downward and forward with respect to the first bent portion 35. The angle B1 is an acute angle. When the angle B1 is reduced to the angle B2, the third bent portion 37 is moved upward and forward with respect to the second bent portion 36.

Therefore, the fourth plate portion 34 can be moved in a manner in which the direction is parallel as far as possible to the axial direction of the steering shaft 12, and the movement distance of the vehicle steering apparatus 10 toward a portion lower than the axial direction of the steering shaft 12 can be reduced.

In FIG. 2, in order to facilitate the comparison of changes between the angles A1 and A2, the angles B1 and B2, and the angles C1 and C2, the position of the fourth plate portion 34 is not moved, and that of the vehicle body 81 is moved. Actually, the position of the vehicle body 81 is not moved, and the fourth plate portion 34 is moved.

When the vehicle steering apparatus 10 is moved in parallel to the axial direction of the steering shaft 12, the force of radially breaking the first pins 57 and the second pins 58 can be effectively exerted. If the vehicle steering apparatus 10 is moved to a portion lower than the axial direction of the steering shaft 12, the first pins 57 and the second pins 58 are pulled while being radially broken, and therefore there arises a problem in that the force of absorbing the shock of a secondary collision is increased. In the embodiment, such a problem can be relieved.

As shown in the table of FIG. 5, a plurality of lower brackets 30 in which the angle B1 and the angle C1 are equal to each other, and set to 90 deg., 81.1 deg., 72.5 deg., and 62.6 deg. were prepared, and the load of a secondary collision was applied to the steering wheel which is not shown. In all the lower brackets 30, the angle A1 is 120 deg. The distance by which the lower bracket was downward moved perpendicularly with respect to the axis of the steering shaft 12 was set as the lowering distance. When the angles B1, C1 were 90 deg., the lowering distance was 7.10 mm. When the angles B1, C1 were 81.1 deg., the lowering distance was 6.33 mm. When the angles B1, C1 were 72.5 deg., the lowering distance was 4.77 mm. When the angles B1, C1 were 62.6 deg., the lowering distance was 0.79 mm.

It was noted that, when the angles B1, C1 are set to an acute angle, the lowering distance is reduced as compared with case of an obtuse angle. It was noted that, the sharper the acute angles B1, C1, the lowering distance is shorter. It can be confirmed from a drawing that, the sharper the acute angle B1, the more easily the third bent portion 37 is upward moved with respect to the second bent portion 36.

The invention is not limited to the embodiment, and may be implemented by modifying in various manners without departing from the spirit of the invention.

In the above-described embodiment, the mechanism in which the shock of a secondary collision is absorbed by breakages of the first pins 57 and the second pins 58 is disposed in the upper bracket 40. In another embodiment, a key is inserted into a long groove, and the long groove is deformed by relatively moving the key with respect to the long groove in the axial direction of the steering shaft 12, thereby absorbing the shock of a secondary collision. The long groove has a width which is narrower than the width of the key, and is widened by the key when a secondary collision occurs.

The application is based on Japanese Patent Application (No. 2012-119593) filed May 25, 2012, and its disclosure is incorporated herein by reference.

INDUSTRIAL APPLICABILITY

According to the invention, it is possible to realize an energy absorbing steering apparatus in which a movement of a plate portion to a position lower than the axis of a steering column is reduced while maintaining its posture.

DESCRIPTION OF THE REFERENCE NUMERALS AND SIGNS

10: vehicle steering apparatus (steering column), 30: lower bracket, 31: first plate portion, 32: second plate portion, 33: third plate portion, 34: fourth plate portion, 35: first bent portion, 36: second bent portion, 37: third bent portion, 81: vehicle body

The invention claimed is:

1. An energy absorbing steering apparatus in which shock applied to a steering column is absorbed by plastic deformation of a bracket for suspending the steering column from a vehicle body, the energy absorbing steering apparatus wherein the bracket includes:
   a first plate portion which is to be fixed to the vehicle body;
   a second plate portion which is bent from a rear edge of the first plate portion toward a lower portion of the vehicle body;
   a third plate portion which is bent from a lower edge of the second plate portion toward a rear upper portion of the vehicle body;
   a fourth plate portion which is bent from an upper edge of the third plate portion toward the lower portion of the vehicle body;
   a first bent portion which is between the first plate portion and the second plate portion;
   a second bent portion which is between the second plate portion and the third plate portion; and
   a third bent portion is between the third plate portion and the fourth plate portion,
   the fourth plate portion is perpendicular to an axial direction of the steering column, and the steering column is fixed to the fourth plate portion,
   an angle of the first bent portion is an obtuse angle, and each of an angle of the second bent portion and an angle of the third bent portion is an acute angle.

2. The energy absorbing steering apparatus according to claim 1, wherein
   the second plate portion and the fourth plate portion are parallel to each other.

3. The energy absorbing steering apparatus according to claim 1, wherein
   the angle of the second bent portion and the angle of the third bent portion are equal to each other and in a relation of alternate-interior angles.

* * * * *